United States Patent [19]

Wilson et al.

[11] Patent Number: 5,377,229
[45] Date of Patent: Dec. 27, 1994

[54] MULTI-MODULATION SCHEME COMPATIBLE RADIO

[75] Inventors: Alan L. Wilson, Hoffman Estates; Mark C. Cudak, Mount Prospect; Bradley M. Hiben, Glen Ellyn; Eric F. Ziolko, Schaumburg; Steven C. Jasper, Hoffman Estates, all of Ill.

[73] Assignee: Motorola, Inc., Schaumburg, Ill.

[21] Appl. No.: 629,931

[22] Filed: Dec. 19, 1990

[51] Int. Cl.$^5$ ............................................. H04L 27/10
[52] U.S. Cl. ............................................. 375/9; 375/17; 375/45; 455/73
[58] Field of Search ....................... 375/7, 8, 9, 44, 45, 375/51, 52, 56, 57, 58, 59, 60, 99, 17, 18, 20, 101, 103, 122; 455/49, 50, 73, 74, 93, 142, 78; 329/300, 304; 370/123, 118

[56] References Cited

U.S. PATENT DOCUMENTS

| | | | |
|---|---|---|---|
| 4,601,048 | 7/1986 | Ryan | 329/302 |
| 4,720,839 | 1/1988 | Feher et al. | 375/58 |
| 4,731,796 | 3/1988 | Masterson et al. | 375/77 |
| 4,843,615 | 6/1989 | Davis | 375/99 |

*Primary Examiner*—Benedict V. Safourek
*Attorney, Agent, or Firm*—Steven G. Parmelee

[57] ABSTRACT

A transceiver compatible with both wide channel constant envelope 4 level FSK FM modulation and narrow channel π/4 differential QPSK linear modulation allows compatible interaction between modified constant envelope and non-constant envelope transmitters. All Nyquist filtering occurs in the transmitters, and none in the receiver.

5 Claims, 5 Drawing Sheets

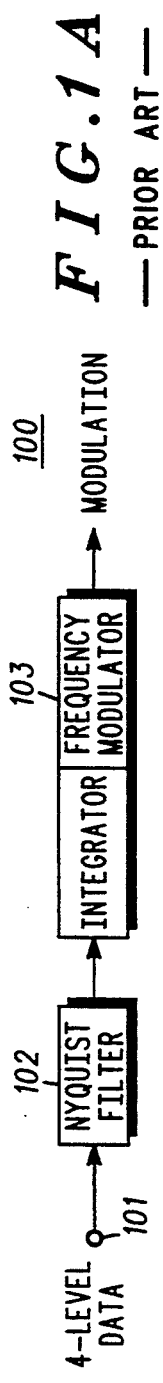
FIG. 1A —PRIOR ART—
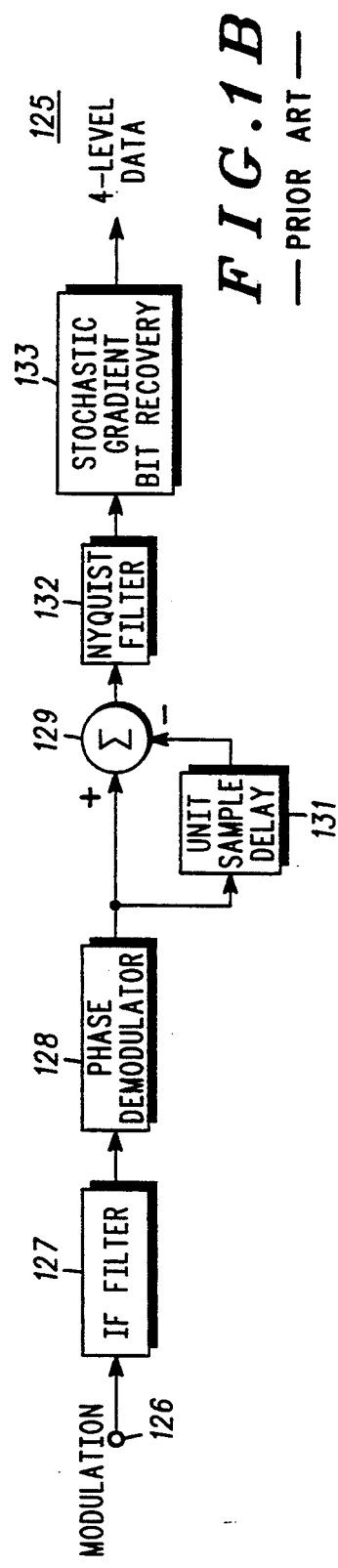
FIG. 1B —PRIOR ART—
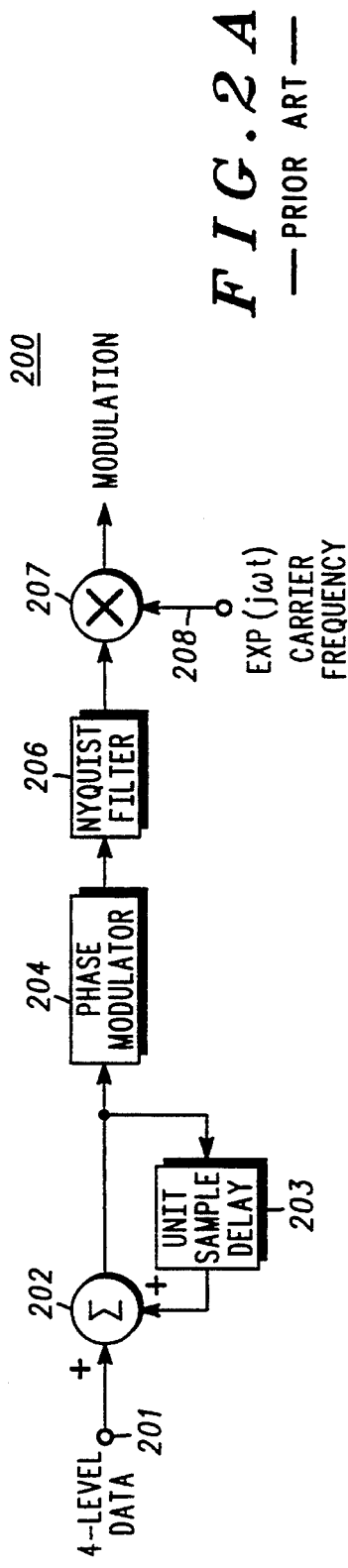
FIG. 2A —PRIOR ART—

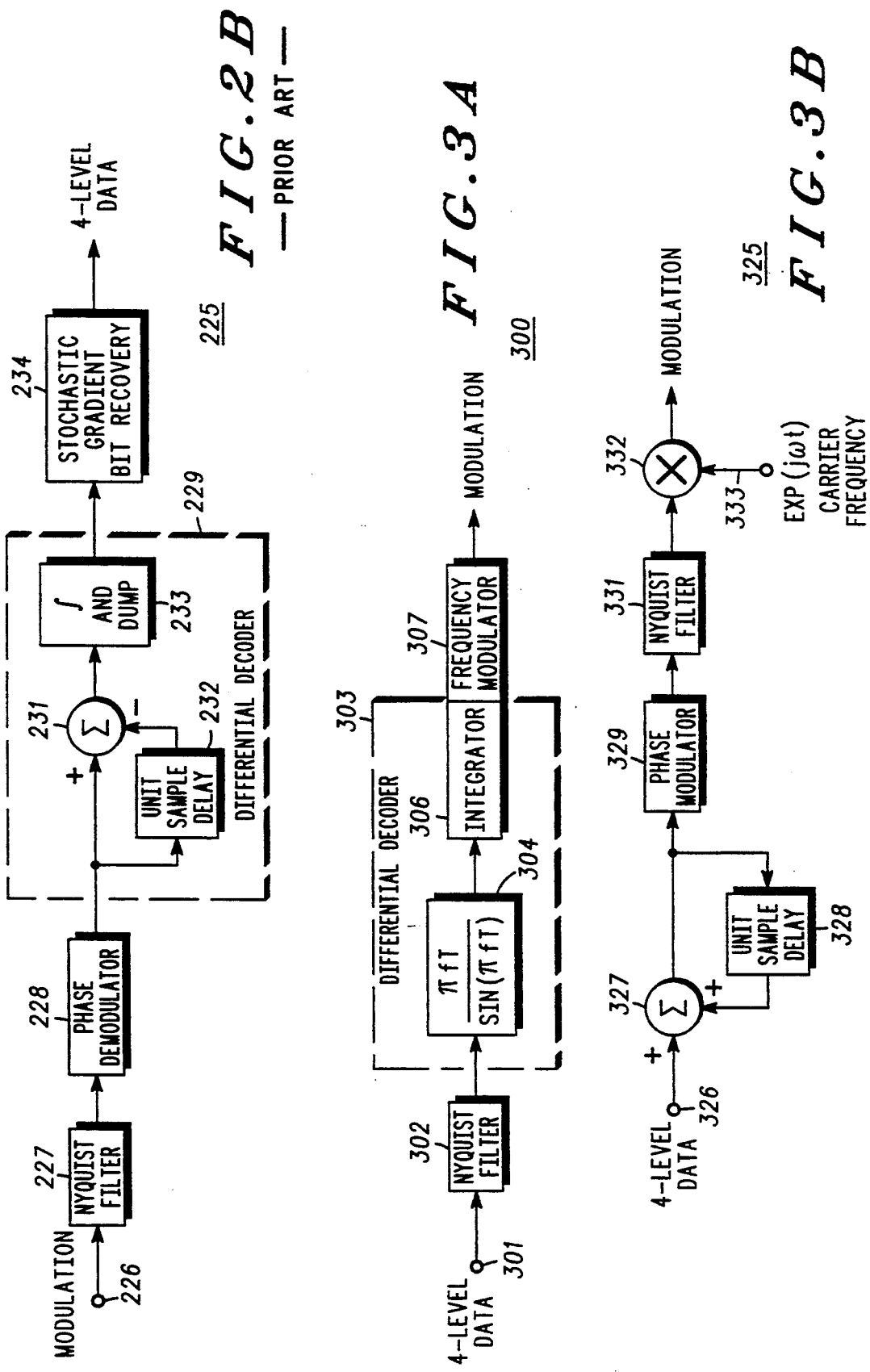

MULTI-MODULATION SCHEME COMPATIBLE RADIO

TECHNICAL FIELD

This invention relates generally to modulation techniques, including but not limited to constant envelope modulation techniques and non-constant envelope modulation techniques, and transmitters and receivers suitable for use therewith.

BACKGROUND OF THE INVENTION

Various modulation techniques are known to support radio communications. For example, constant envelope modulation techniques, such as frequency modulation (FM), are well known and understood. Non-constant envelope modulation techniques, such as $\pi/4$ differential QPSK, are also known.

Digital signalling techniques suitable for use with various modulation schemes are also known, such as $\pi/4$ differential QPSK (noted above) and 4 level FSK as used with FM. Although both techniques are well understood, present technology readily supports rapid introduction of 4 level FSK FM based radios, whereas $\pi/4$ differential QPSK based non-constant envelope radios pose a greater challenge. Although the various barriers to fielding a technologically and economically viable platform to support such signalling and modulation will no doubt exist in the near term future, users who require digital signalling will typically find 4 level FSK FM a more likely candidate for relatively immediate implementation.

Radio system users greatly desire immediate availability of digital signalling, in part for reasons of spectral efficiency, and in part to support various desired operating features. These same users, however, do not wish to invest in currently available technology at the expense of being either foreclosed from next generation advances, or at the expense of eliminating a currently acquired digital signalling system in favor of a next generation platform. In short, system users do not wish to acquire a 4 level FSK FM system to serve immediate needs, with the likely availability of $\pi/4$ differential QPSK radios in the future. At the same time, however, these same users want to realize the benefits of digital signalling now.

Accordingly, a need exists for some communications approach that will satisfy the current need for digital signalling, such as 4 level FSK FM, and yet viably accommodate likely future technologies, such as $\pi/4$ differential QPSK, in a cost effective manner.

SUMMARY OF THE INVENTION

This need and others are substantially met through provision of a radio transceiver, which transceiver includes a transmitter having a Nyquist filter, and a corresponding receiver that does not include a Nyquist filter. A filter that satisfies Nyquist's well-known criterion for minimizing intersymbol interference can be constructed from a filter function which uses a raised cosine rolloff in the transition region between the passband and the stopband. Such a raised cosine function is well-known in the art, and is discussed in some detail later in this description. Such a filter will be called a "Nyquist filter" for convenience.

In one embodiment, the transmitter may be configured to transmit either a constant envelope signal, or a non-constant envelope signal, depending upon the intent of the designer. The receiver, however, functions to receive and properly demodulate either a constant envelope signal or a non-constant envelope signal. So provided, a system can accommodate a plurality of users, wherein some of the users transmit constant envelope signals and other users transmit non-constant envelope signals. Regardless of the transmission type, however, all radios are capable of receiving and demodulating all signals.

So provided, constant envelope transmitters can be coupled with the above receiver to allow provision of 4 level FSK radios to meet near term needs. Later, as economic issues are resolved, radios having $\pi/4$ differential QPSK transmitters can be introduced into the system. A system operator is therefore provided with radios that meet immediate needs, while yet retaining a compatible migration path that readily accommodates a next generation platform.

In one embodiment, the constant envelope signal and the non-constant envelope signal can occupy differing spectral bandwidths. Notwithstanding this difference, the receiver can yet receive and properly demodulate both signals.

BRIEF DESCRIPTION OF THE DRAWINGS

FIGS. 1a–b comprise block diagram depictions of prior art 4 level FSK FM transmitter and receiver structures;

FIGS. 2a–b comprise block diagram depictions of prior art $\pi/4$ differential QPSK transmitter and receiver structures;

FIGS. 3a–c comprise block diagram depictions of a 4 level FSK transmitter and a $\pi/4$ differential QPSK transmitter, respectively, and a receiver suitable for use with both transmitters.

DETAILED DESCRIPTION OF A PREFERRED EMBODIMENT

Figure 3C:
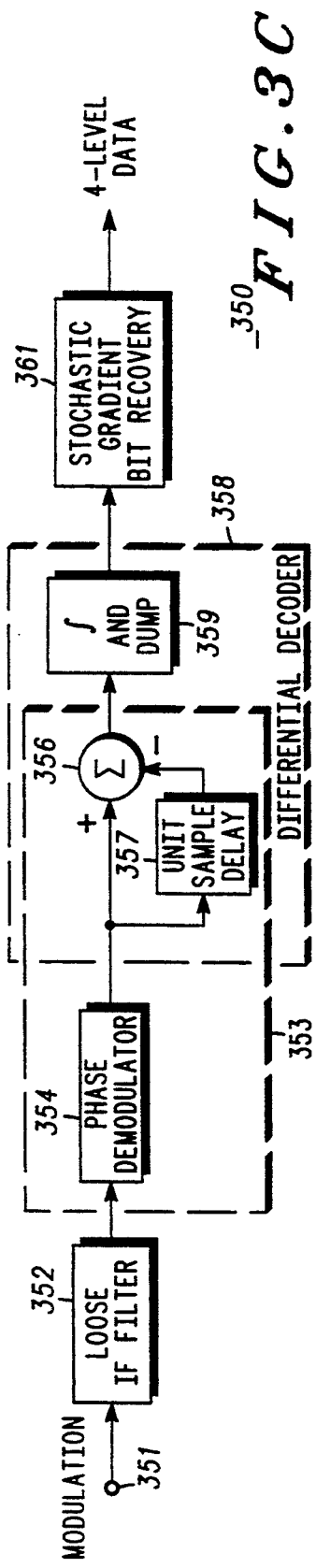

Prior to describing an embodiment of the invention, it will be helpful to first briefly describe currently proposed 4 level FSK and $\pi/4$ differential QPSK transceiver structures.

FIG. 1a depicts pertinent components of a 4 level FSK transmitter (100). The transmitter includes a Nyquist filter (102) designed to have a roll-off factor of 0.2. The Nyquist filter (102) processes the 4 level data as a function of the square root of the raised cosine.

Subsequent to Nyquist filtering, a frequency modulator (103) having a deviation index of 0.27 effectively integrates the previously filtered data, and then frequency modulates the data with respect to a predetermined carrier, as represented by $e^{j(\phi+\omega t)}$. For purposes of simplicity, the above functions are readily implementable in a DSP, such as a DSP56000 family device as manufactured and sold by Motorola, Inc. The blocks described, and other blocks not described but typically included in a transmitter (such as a power amplifier), are well understood by those skilled in the art, and hence further description would serve no pertinent purpose here.

FIG. 1b depicts relevant components for a proposed 4 level FSK receiver (125). An IF filter (127) filters a received modulation signal (126), which filtered signal is then frequency demodulated. In this embodiment, the frequency demodulator includes an inverse tangent block (128) that feeds its signal to a differential summer (129), the inverting input of which couples to a unit sample delay (131). (Though described as a differential summer, this element really appears as an approximate differentiator. The approximation is based on the first difference in a discrete time system to approximate the true differentiator of a continuous time system.) The output of the differential summer (129) couples to a Nyquist filter (132) (again having a roll-off factor of 0.2), and the resultant data residing within the Nyquist filtered and demodulated signal is recovered by a stochastic gradient bit recovery block (133).

As with the transmitter (100) described above, the above generally referred to functions can be readily implemented in a DSP, and are otherwise sufficiently well known and understood by those skilled in the art such that further elaboration need not be presented here.

FIG. 2a depicts a proposed $\pi/4$ differential QPSK transmitter (200). Again presuming a 4 level data source (201), a summer (202) sums this data with a feed back signal processed through a unit sample delay (203), the latter components cooperating to realize a differential encoder. A phase modulator (204) then processes the encoded signal as a function of $e^{j\phi}$ to thereby yield complex in phase and quadrature components at, in this embodiment, one sample per symbol. The in phase and quadrature components are then Nyquist filtered (206) (where the roll-off factor=0.2) and mixed (207) with an appropriate carrier frequency (208) to yield the desired modulation.

FIG. 2b depicts a proposed $\pi/4$ differential QPSK receiver suitable for receiving and demodulating a signal sourced by the above described transmitter (200). The receiver (225) receives the modulation (266) and Nyquist filters (227) the captured signal. The Nyquist filter (227) has a roll-off factor of 0.2. A phase demodulator (228) processes the Nyquist filtered signal as a function of an inverse tangent, and then provides the phase demodulated signal to a differential decoder (229). The differential decoder (229) includes a differential summer (231) that receives the phase demodulated signal and also the phase demodulated signal as processed through a unit sample delay (232). The resultant signal is then processed in an integrate and dump filter (233). A stochastic gradient bit recovery mechanism (234) then processes the decoded information to yield a 4 level data output, as generally referred to above with respect to FIG. 1b.

The blocks generally referred to above with respect to both the transmitter (200) and the receiver (225) for the $\pi/4$ differential QPSK modulation are relatively well understood by those skilled in the art, as well as other components that would be appropriate to complete a transmitter and receiver, such as power amplifiers, transmission elements, and the like. Therefore, no additional description need be provided here.

The above described constant envelope and non-constant envelope receivers and transmitters are essentially incompatible with one another. For example, the 4 level FSK FM modulation provided by the first described transmitter (100) cannot be properly recovered and decoded using the second described receiver (225). Therefore, a selection of either one or the other transmitter/receiver (100/125 or 200/225) for use in a particular system will preclude an ability to compatibly select later the previously undesignated transmitter/receiver.

Referring now to FIGS. 3a-c, a solution to this dilemma will be presented.

First, in FIG. 3a, a constant envelope transmitter suitable for transmitting 4 level FSK FM modulation in a 12.5 kHz channel appears as generally depicted by reference numeral 300. This constant envelope transmitter (300) processes incoming 4 level data (301) through a raised cosine Nyquist filter (302) having a roll-off factor of 0.2. Those skilled in the art will note that, whereas the previously described proposed transmitters include Nyquist filters wherein the raised cosine function appears in both the transmitter and receiver as a square root function, here the raised cosine function is not so circumscribed. Instead of distributing the Nyquist filtering between the transmitter and receiver, all Nyquist filtering, in this embodiment, occurs at the transmission end.

Subsequent to Nyquist filtering, a differential encoder (303) processes the Nyquist filtered signal in a band limited filter (304) as a function of $$\frac{\pi fT}{\sin(\pi fT)}.$$

A particular design problem, in this embodiment, involves computing the impulse response of this filter (304). Let $H(\omega)$=frequency response of ideal Nyquist raised cosine filter The normalized corner frequency is 1 rad./sec. The normalized symbol time (denoted by T) is $\pi$ seconds.

The symbol rate is the reciprocal of the symbol time, or $1/\pi$ seconds. One half the symbol rate is then $\frac{1}{2}\pi$ seconds.

The normalized corner frequency has been expressed in angular measure as 1 radian per second. Frequency in hertz may be computed from angular frequency according to the relation $f=\omega/2\pi$, where f is the frequency in hertz, and $\omega$ is the angular frequency. By substitution, then, the normalized corner frequency in Hertz is $\frac{1}{2}\pi$ hertz. Thus, for the example given here, the corner frequency of the Nyquist filter is equal to one-half the symbol rate.

$H(\omega)=1$ where $|\omega| \leq 1-\alpha$ $$H(\omega) = \frac{1}{2} + \frac{1}{2} \cos\left(\frac{\pi(|\omega| - 1 + \alpha)}{2\alpha}\right)$$

where $1-\alpha < |\omega| \leq 1+\alpha$ $H(\omega)=0$ where $1+\alpha < |\omega|$ the impulse response of the filter may then be found using the inverse Fourier transform:

$$h(t) = \frac{1}{2\pi} \int_{-\infty}^{\infty} H(\omega)e^{j\omega t}d\omega$$

$$= \frac{1}{\pi} \int_{0}^{\infty} H(\omega)\cos(\omega t)d\omega$$

since $H(\omega)$ is an even function $$= \frac{1}{\pi} \int_0^{1-\alpha} \cos(\omega t)d\omega + \frac{1}{2\pi} \int_{1-\alpha}^{1+\alpha} \cos(\omega t)d\omega +$$

$$\frac{1}{2\pi} \int_{1-\alpha}^{1+\alpha} \cos\left(\frac{\pi(\omega - 1 + \alpha)}{2\alpha}\right)\cos(\omega t)d\omega$$

The product rule, cosine (x) cosine (y) equals 0.5 cosine (x+y)+0.5 cosine (x−y) is then used, and the integration then performed.

$$h(t) = \frac{\sin((1-\alpha)t)}{\pi t} + \frac{\sin((1+\alpha)t) - \sin((1-\alpha)t)}{2\pi t} +$$

$$\frac{\sin(\pi + (1+\alpha)t) - \sin((1-\alpha)t)}{4\pi\left(\frac{\pi}{2\alpha} + t\right)} +$$

$$\frac{\sin(\pi - (1+\alpha)t) + \sin((1-\alpha)t)}{4\pi\left(\frac{\pi}{2\alpha} - t\right)}$$

Next, use sin $(\pi+x) = -\sin(x)$, and algebraically regroup the terms to yield the following result.

$$h(t) = \frac{\pi}{8\alpha^2 t} \cdot \frac{\sin((1+\alpha)t) + \sin((1-\alpha)t)}{\left(\frac{\pi}{2\alpha}\right)^2 - t^2}$$

Finally, using sine (x+y)+sine (x−y) equals 2 sine (x) cosine (y), one obtains $$h(t) = \frac{\pi \sin(t)\cos(\alpha t)}{t(\pi^2 - 4\alpha^2 t^2)}$$

The filter function h(t) can now be sampled at discrete time intervals to realize a Nyquist raised cosine finite impulse response (FIR) filter in a DSP embodiment.

Now, consider the shaping filter f(t). If we let F(ω) equal the frequency response of the shaping filter (304), and T equals symbol time equal 208.333 microseconds for 9600 bps equal $\pi$ seconds for the normalized system used in H above, then $$F(\omega) = \frac{\frac{\omega T}{2}}{\sin\left(\frac{\omega T}{2}\right)}$$

for all frequencies. With a roll-off factor of 0.2 for the Nyquist filter H(ω), $-1.2\pi < \omega T < 1.2\pi$ becomes the frequency range of interest for F(ω). Such a filter function cannot be directly integrated with elementary calculus. Numerical methods could be used to compute the inverse Fourier integral, but that presents significant difficulties. A discrete Fourier transform method could be used or the FFT version of this transform could be used, to speed up the calculation. Such methods would be suitable presuming availability of sufficient processing abilities. In this embodiment, however, another method is preferred. Here, the function F will be approximated with a Fourier series of cosine terms that are then transformed to the time domain. To begin, select a suitable time interval that approximates F. This must equal or exceed plus or minus $1.2\pi$ and be less than plus or minus $2\pi$ since a singularity in F exists at WT equals to $\pi$. Plus or minus $1.3333\pi$ constitutes a useful interval, since this allows the samples to be spaced six samples apart when over sampling H by a factor of 8.

With the above in mind, $$F(x) = \frac{\pi x}{\sin(\pi x)}$$

where x = normalized frequency $$= fT = \frac{\omega T}{2\pi} = f_0 + \sum_{k=1}^{\infty} f_k \cos\left(\frac{2\pi k x}{1.33333}\right)$$

which is the Fourier series expansion $$f_0 = 0.75 \int_{-2/3}^{2/3} F(x)dx$$

$$f_k = 1.5 \int_{-2/3}^{2/3} F(x)\cos\left(\frac{2\pi k x}{1.33333}\right)dx \text{ for } k > 0$$

These integrals are easily evaluated numerically. The first 12 terms are tabulated below.

TABLE 1

| k | fk |
|---|---|
| 0 | 1.35697 |
| 1 | −0.4839 |
| 2 | 0.189043 |
| 3 | −0.0982102 |
| 4 | 0.0594481 |
| 5 | −0.0396059 |
| 6 | 0.0281791 |
| 7 | −0.0210304 |
| 8 | 0.0162746 |
| 9 | −0.0129571 |
| 10 | 0.0105541 |
| 11 | −0.00875928 |

Upon plotting the function F(x) and its Fourier series approximation, one ascertains a sufficiently close relationship. The series is within 1% of the desired value at most places in the passband of the Nyquist filter, though the error does approximate 2% near the band edge just before the Nyquist filter cuts off.

The inverse Fourier transform can then be performed on the series as follows:

$$f(t) = \frac{1}{2\pi} \int_{-\infty}^{\infty} F(\omega) e^{j\omega t} d\omega$$

$$= \frac{1}{2\pi} \int_{-\infty}^{\infty} \left(f_0 + \sum_{k=1}^{\infty} f_k \cos\left(\frac{k\omega t}{1.33333}\right)\right) e^{j\omega t} d\omega$$

$$= \frac{1}{2\pi} \left(f_0 \delta(t) + \sum_{k=1}^{\infty} \frac{f_k}{2} \delta(t + 0.75kT) + \sum_{k=1}^{\infty} \frac{f_k}{2} \delta(t - 0.75kT)\right)$$

where the Dirac delta function is represented as δ(t). Upon sampling at eight samples per symbol, non-zero samples are obtained at 0.75×8=6 sample intervals. The middle or zeroth sample has amplitude f0 and the remaining samples have amplitudes $f_k/2$ for k equals plus or minus 1, plus or minus 2, plus or minus 3, and so forth. This can then be cascaded with the h(t) function computed above to yield the filters necessary for this filter.

Subsequent to filtering, an integration function (306) completes the differential encoding process. Then, the signal can be frequency modulated as a function of $e^{j(\phi+\omega t)}$, while maintaining a deviation index of 0.25. The resultant modulation can then be appropriately amplified and transmitted in accordance with a particular application.

FIG. 3b depicts a non-constant envelope transmitter (325) suitable for use in transmission of a $\pi/4$ differential QPSK signal having a bandwidth of 6.25 kHz. A summer (327) receives a 4 level data input (326) and sums that with a feedback signal (328). This provides a differential encoder process as generally referred to above with respect to FIG. 2a. Also as presented in FIG. 2a, a phase modulator (329) processes the signal and provides complex in-phase and quadrature components at one sample per symbol. These components are then filtered in a raised cosine Nyquist filter (331). As with the constant envelope transmitter (300) described above, this raised cosine Nyquist filter (331) has a roll-off factor of 0.2, and does not process the signal as a function of a square root of the raised cosine. Instead, all Nyquist processing from source to destination occurs in the transmitter (325). Subsequent to Nyquist filtering, a mixer (332) mixes the information signal with an appropriate carrier frequency (333) and the desired $\pi/4$ differential QPSK modulation results.

Figure 4:
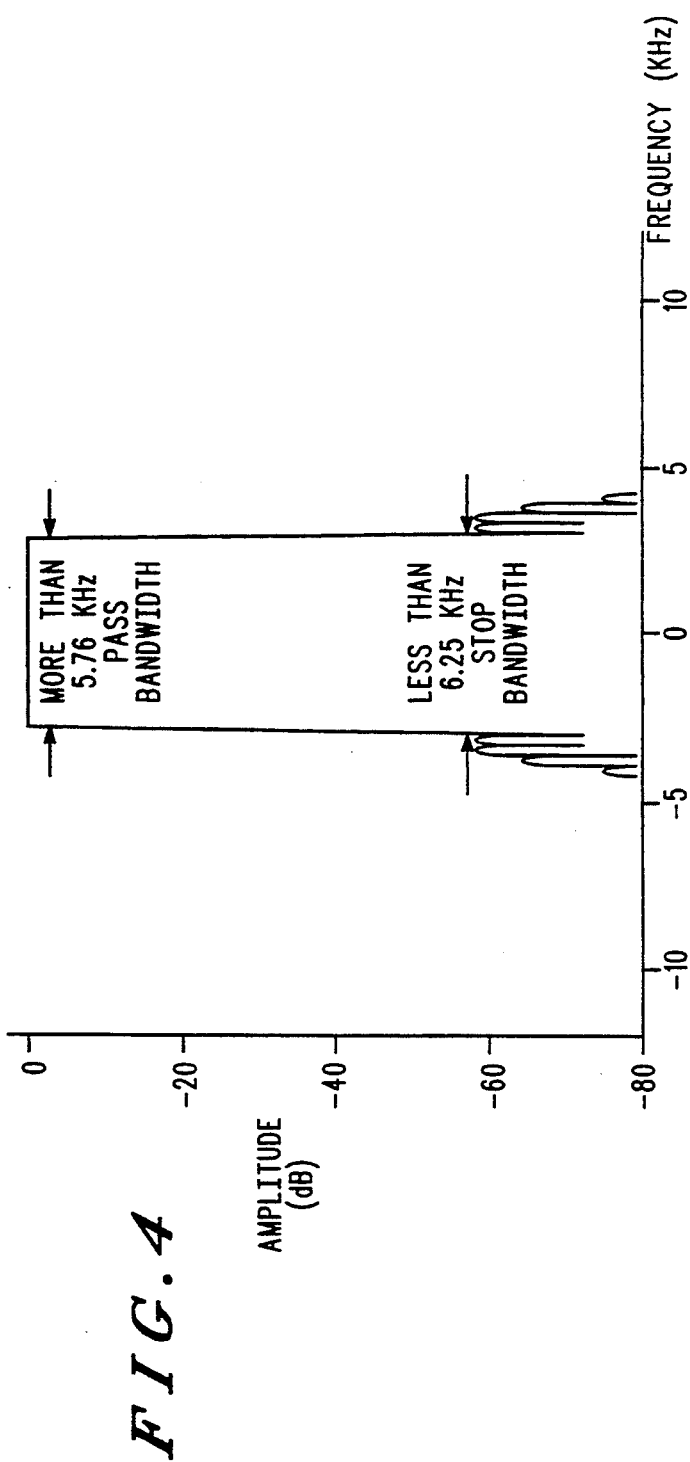
FIG. 4 depicts IF filter design constraints.

FIG. 3c depicts a receiver suitable for use in receiving and decoding modulation from either of the above described transmitters (300 and 325). Received modulation (351) couples to a loose IF filter (352). Design of this IF filter crucially affects the ability of the receiver (350) to properly receive either a wide frequency modulation signal (as presented in a 12.5 kHz channel) or a narrow linear modulation signal (as presented in a 6.25 kHz channel). In particular, the IF design must accommodate a pass bandwidth wide enough and flat enough to avoid intersymbol interference while having a stop bandwidth that is narrow enough to allow 6.25 kHz channel spacing. The constraints on the filter design are presented in FIG. 4 for a system with 9600 bits/second of throughput in a 6.25 kHz channel. As noted above, a Nyquist raised cosine filter having a roll-off factor of 0.2 appears in the transmitter. The stop bandwidth limit is 6.25 kHz while the pass bandwidth limit is designed to exceed $$(1 + \alpha)\frac{9600}{2} = 5.76 \text{ kHz.}$$

Due to the very demanding transition ratio, $$r = \frac{\text{stop bandwidth}}{\text{pass bandwidth}} < \frac{6.25}{5.76} = 1.085,$$

the number of necessary filter coefficients is about 350 when implementing such a filter in a single finite impulse response configuration. Since computation complexity is directly proportional to the number of filter coefficients, this constitutes an obvious drawback. In this embodiment, the loose IF filter (352) uses two FIR filters in a DSP embodiment. In particular, a decimating filter first narrows the bandwidth enough to reduce the sample rate for introduction to the subsequent filter, the latter providing a rapid filter roll-off. Both FIR filters in this embodiment are equi-ripple designs. The first FIR filter attains 80 db of stop band rejection with a stop frequency of 4.68 kHz and a pass frequency of 3 kHz. The second FIR filter has a stop frequency of 3.00 kHz and a pass frequency of 2.88 kHz. Parameters for both FIR filters appear in Table 2, below.

TABLE 2

| Parameter | FIR 1 | FIR 2 |
|---|---|---|
| $f_s$ = sample frequency | 38.4 kHz | 7.68 kHz |
| $f_1$ = passband corner frequency | 3.00 kHz | 2.88 kHz |
| $f_2$ = stopband corner frequency | 4.68 kHz | 3.00 kHz |
| r = transition ratio = $f_1/f_2$ | 1.56 | 1.04165 |
| stopband rejection | 100 dB | 57.5 dB |
| passband ripple | 0.0012 dB | 0.4 dB |
| number of filter coefficients | 128 | 128 |

Even though the second FIR filter attains a tighter transition ratio than the specified requirement for a 6.25 kHz channel, it does so with fewer filter coefficients than the previously referred to approach.

Subsequent to IF filtering, a frequency demodulator (353) demodulates constant envelope information. To this extent, the frequency demodulator includes an inverse tangent block (354), a differential summer (356) and a unit sample delay path (357) as essentially described above with respect to the proposed 4 level FSK receiver (125).

Figure 5A:
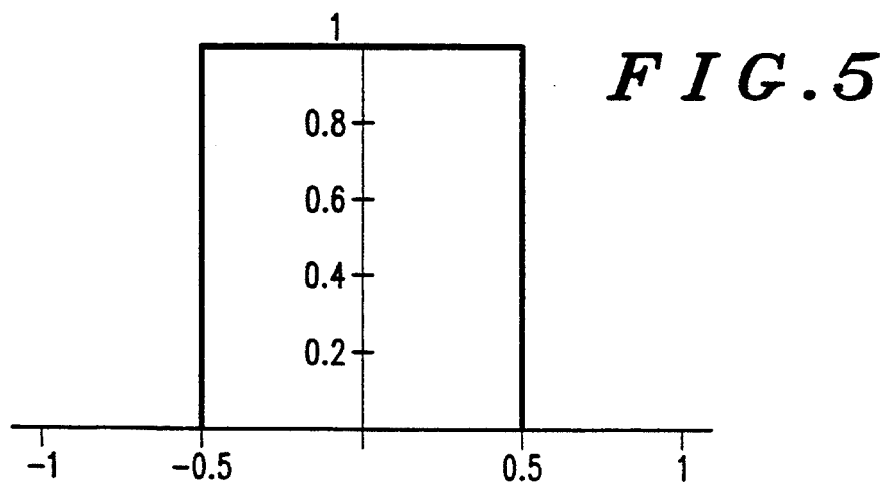
FIG. 5a represents the impulse response of an integrate and dump filter.
Figure 5B:
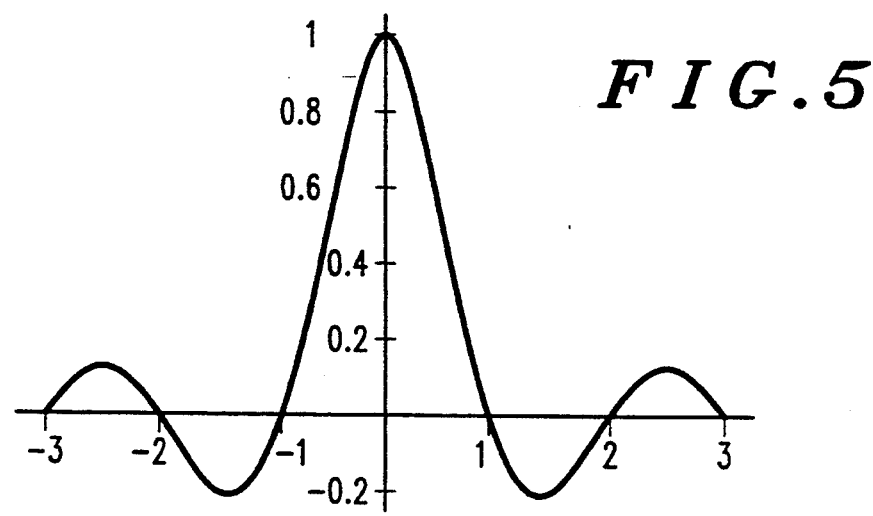
FIG. 5b represents the frequency response of the integrate and dump filter.
Figure 5C:
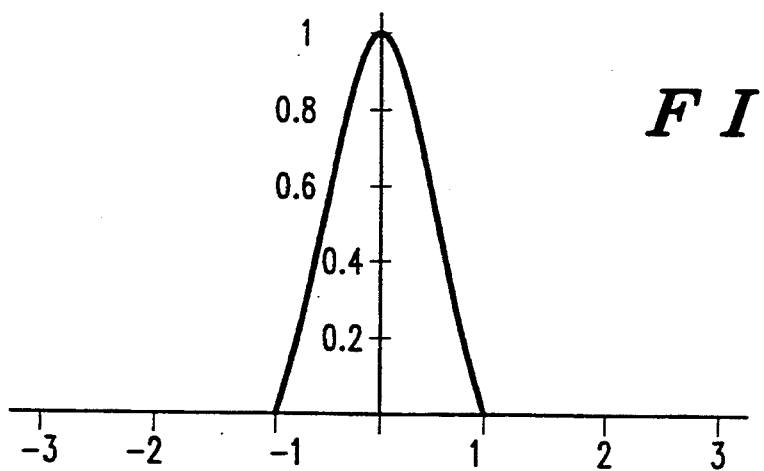
FIG. 5c represents the band limited frequency response of the integrate and dump filter.

The receiver (350) also includes a differential decoder (358) substantially as described above for the $\pi/4$ differential QPSK receiver (255), inclusive of the unit sample delay path (357) and the differential summer (356), in conjunction with an integrate and dump filter (359). The integrate and dump filter essentially comprises a linear filter that integrates over a predetermined sample period and then dumps historical data in preparation for a new integration window. The impulse response for the integrate and dump filter appears in FIG. 5a, where the vertical scale represents normalized amplitude and the horizontal scale represents normalized time in seconds for T=1 second. A corresponding frequency response (reflective of the familiar $$\frac{\sin(\pi f T)}{\pi f T}$$

filter response) appears in FIG. 5b, where the vertical scale again represents normalized amplitude and the horizontal scale represents normalized frequency in Hertz for T=1 second. In this integrate and dump filter (359), some portion of the side lobes are filtered out of the frequency response, therefore yielding a band limited filter. To achieve perfect symbol recovery, a frequency response in the range of $$\frac{-(1 + \alpha)}{2T} \text{ Hz to } \frac{1 + \alpha}{2T} \text{ Hz}$$

must be retained. Taking advantage of the spectral null at 1/T Hz, the response is restricted to a low pass filter cutoff at 1/T Hz. The resulting frequency response appears in FIG. 5c, where the vertical and horizontal scales are as described earlier for FIG. 5b.

The impulse response for this filter (359) can be directly calculated with an inverse Fourier transform. A closed form solution can be expressed in terms of the sine integral function Si (X) as shown below. Let H(x)=frequency response of bandlimited filter $$= \frac{\sin(\pi x)}{\pi x} \quad \text{for } |x| < 1$$
$$= 0 \quad \text{for } |x| \geq 1$$

h(t)=inverse Fourier transform of H(x) Let $\omega = 2\pi x$ $$= \frac{1}{\pi} \int_0^{2\pi} \frac{2}{\omega} \sin\left(\frac{\omega}{2}\right) \cos(\omega t) d\omega$$

since $H(\omega)$ is an even function $$= \frac{1}{\pi} \int_0^{2\pi} \frac{1}{\omega}\left(\sin\left(\left(t + \frac{1}{2}\right)\omega\right) - \sin\left(\left(t - \frac{1}{2}\right)\omega\right)\right) d\omega$$

using a trig identity $$= \frac{1}{\pi}\left(\int_0^{2\pi(t+1/2)} \sin(y)\frac{dy}{y} - \int_0^{2\pi(t-1/2)} \sin(y)\frac{dy}{y}\right)$$

substituting variables $$= \frac{1}{\pi}\left(Si\left(2\pi\left(t + \frac{1}{2}\right)\right) - Si\left(2\pi\left(t - \frac{1}{2}\right)\right)\right) \text{ where } Si(x) = \int_0^x \frac{\sin(t)}{t} dt$$

Following this, a stochastic gradient bit recovery mechanism (361) is again provided and the resultant 4 level data recovered.

So configured, a number of salient points should now be evident to those skilled in the art. First, the receiver provides no Nyquist filtering. All Nyquist filtering occurs in the transmitters. (The rolloff ratio constitutes the important variable to be controlled in a Nyquist filter. In prior art transceivers using Nyquist filters, this ratio must be identical for both the transmitter filter and the receiver filter. Here, the receiver is independent of this variable, and can receive signals from different transmitters that use different values for the rolloff ratio.) Second, the receiver can effectively demodulate and recover either constant envelope signals or non-constant envelope signals, such as 4 level FSK FM or $\pi/4$ differential QPSK linear modulation. Third, this receiver can accommodate these alternative modulation types, notwithstanding differing channel widths, in this case 12.5 kHz and 6.25 kHz, respectively.

With the architectures described above, a system operator can select to realize the advantages of digital signalling by fielding 4 level FSK FM transmitters coupled with the described compatible receiver. At such time as linear transmission technologies make viable economic fielding of $\pi/4$ differential QPSK transmitters, the operator can introduce such transmitters into a system in conjunction with the same compatible receiver as used for the constant envelope transceivers. Notwithstanding differing modulation types and differing bandwidth requirements, the same receiver platform allows compatible communication between these differing units.

Figure 6:
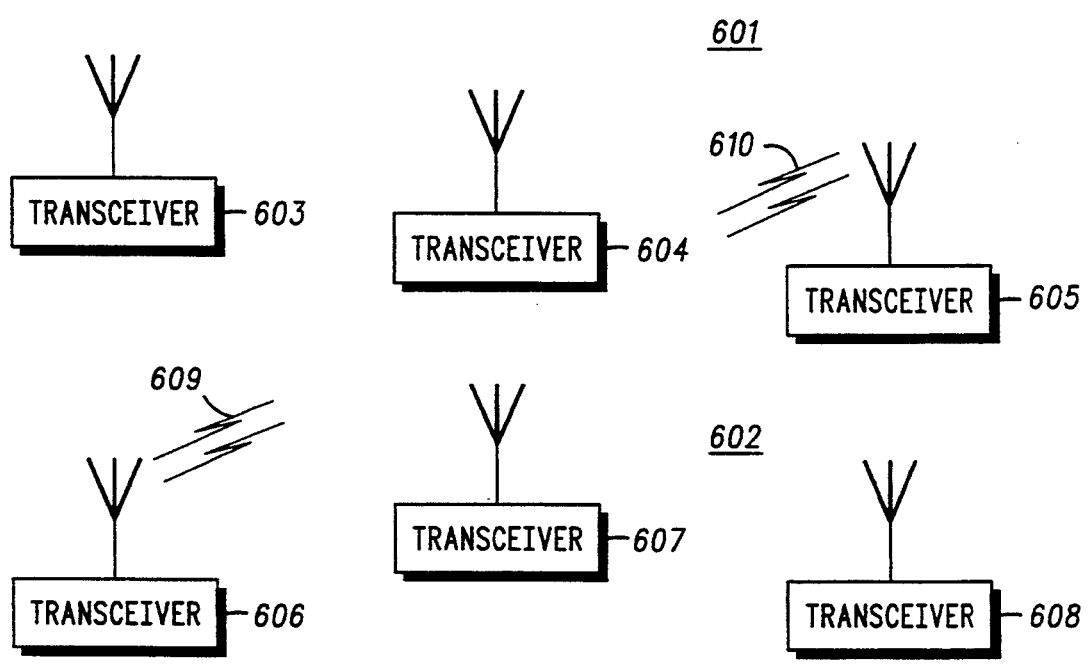
FIG. 6 depicts a radio communication system in the manner taught by the present invention.

FIG. 6 depicts a communication system of the type just described. A first group (601) of transceivers (603, 604, and 605) includes transmitter portions capable of transmitting constant envelope signals, such as 4 level FSK, while the receiver portions of the transceivers in this group (601) are equipped to receive both constant envelope signals, as just described, and non-constant envelope signals (such as $\pi/4$ differential QPSK). A second group (602) of transceivers (606, 607, and 608) includes transmitter portions that originate non-constant envelope transmissions, while the receiver portions can receive and demodulate both constant and non-constant envelope signal types. Consequently, transceivers from the first group (601) of communication units can communicate with units from the second group (602).

What is claimed is:

1. A radio transceiver capable of transmitting and receiving quantized digital information signals having two or more levels and a predetermined symbol rate, the transceiver comprising:
    A) a transmitter including a filter that satisfies Nyquist's criterion for minimizing intersymbol interference, the filter having a bandwidth in Hertz of approximately one half the symbol rate; and
    B) a receiver including means for amplifying a received signal and means for recovering digital information signals from the received signal; wherein, instead of distributing filtering intended to minimize intersymbol interference between the transmitter and the receiver, all such filtering occurs at the transmitter.

2. A radio transceiver capable of transmitting and receiving quantized digital information signals having two or more levels and a predetermined symbol rate, the transceiver comprising:
    A) a transmitter, comprising at least a filter that satisfies Nyquist's criterion for minimizing intersymbol interference, the filter having a bandwidth in Hertz of approximately one half the symbol rate, and means for modulating a carrier frequency with a digital information signal, and transmitting at least one of:
        i) a constant envelope signal; and
        ii) a non-constant envelope signal; and
    B) a receiver including means for amplifying a received signal and means for recovering digital information signals from the received signal, wherein the receiver is capable of receiving and properly demodulating both:
        i) a constant envelope signal; and
        ii) a non-constant envelope signal;
    wherein, instead of distributing filtering intended to minimize intersymbol interference between the transmitter and the receiver, all such filtering occurs at the transmitter.

3. A radio transceiver capable of transmitting and receiving quantized digital information signals having two or more levels and a predetermined symbol rate, the transceiver comprising:
    A) a transmitter, comprising at least a filter that satisfies Nyquist's criterion for minimizing intersymbol interference, the filter having a bandwidth in Hertz of approximately one half the symbol rate, and means for modulating a carrier frequency with a digital information signal, and transmitting at least one of:
        i) a constant envelope signal occupying a first spectral bandwidth; and ii) a non-constant envelope signal occupying a second spectral bandwidth, which second spectral bandwidth is different from the first spectral bandwidth; and B) a receiver including means for amplifying a received signal and means for recovering digital information signals from the received signal, wherein the receiver is capable of receiving and properly demodulating both:

i) a constant envelope signal occupying the first spectral bandwidth; and ii) a non-constant envelope signal occupying the second spectral band width;

wherein, instead of distributing filtering intended to minimize intersymbol interference between the transmitter and the receiver, all such filtering occurs at the transmitter.

4. A radio transceiver capable of transmitting and receiving quantized digital information signals having two or more levels and a predetermined symbol rate, the transceiver comprising:

A) a transmitter, comprising:

i) a filter that satisfies Nyquist's criterion for minimizing intersymbol interference, the filter having a bandwidth in Hertz of approximately one half the symbol rate;

ii) differential encoder means coupled to the filter for filtering an input information signal to cause selective rotation of a phase value of a modulated signal by a predetermined amount; and iii) frequency modulator means operably coupled to the differential encoder means for outputting the modulated signal; and B) a receiver including means for amplifying a received signal and means for recovering digital information signals from the received signal, wherein the receiver is capable of receiving and properly demodulating both:

i) a constant envelope signal occupying a first spectral bandwidth; and ii) a non-constant envelope signal occupying a second spectral bandwidth, wherein the first spectral bandwidth is different from the second spectral bandwidth; wherein, instead of distributing filtering intended to minimize intersymbol interference between the transmitter and the receiver, all such filtering occurs at the transmitter.

5. A radio communication system, comprising:

A) a first plurality of transceivers capable of transmitting and receiving quantized digital information signals having two or more levels and a predetermined symbol rate, each transceiver comprising:

i) a transmitter, comprising at least a filter that satisfies Nyquist's criterion for minimizing intersymbol interference, the filter having a bandwidth in Hertz of approximately one half the symbol rate, and means for modulating a carrier frequency with a digital information signal, and transmitting a constant envelope signal occupying a first spectral bandwidth;

ii) receiver means including means for amplifying a received signal and means for recovering digital information signals from the received signal, wherein the receiver is capable of receiving and properly demodulating both:

a) a constant envelope signal occupying the first spectral bandwidth; and b) a non-constant envelope signal occupying a second spectral bandwidth, which second spectral bandwidth is different than the first spectral bandwidth;

wherein, instead of distributing filtering intended to minimize intersymbol interference between the transmitter and the receiver, all such filtering occurs at the transmitter; and B) a second plurality of transceivers capable of transmitting and receiving quantized digital information signals having two or more levels and a predetermined symbol rate, each transceiver comprising:

i) a transmitter, comprising at least a filter that satisfies Nyquist's criterion for minimizing intersymbol interference, the filter having a bandwidth in Hertz of approximately one half the symbol rate, and means for modulating a carrier frequency with a digital information signal, and transmitting a non-constant envelope signal occupying the second spectral bandwidth; and ii) receiver means including means for amplifying a received signal and means for recovering digital information signals from the received signal, wherein the receiver is capable of receiving and properly demodulating both:

a) a constant envelope signal occupying the first spectral bandwidth; and b) a non-constant envelope signal occupying the second spectral bandwidth;

wherein, instead of distributing filtering intended to minimize intersymbol interference between the transmitter and the receiver, all such filtering occurs at the transmitter; such that transceivers from the first plurality of transceivers can compatibly communicate with transceivers from the second plurality of transceivers.

* * * * *